United States Patent
Claycomb et al.

(10) Patent No.: US 10,075,041 B2
(45) Date of Patent: Sep. 11, 2018

(54) MOTOR FOR AN ELECTROHYDRAULIC ACTUATOR

(71) Applicant: Goodrich Control Systems, Solihull, West Midlands (GB)

(72) Inventors: Chris H. A. Claycomb, Leighton Buzzard (GB); Andrew E. Page, Tring (GB)

(73) Assignee: GOODRICH CONTROL SYSTEMS, West Midlands (GB)

( * ) Notice: Subject to any disclaimer, the term of this patent is extended or adjusted under 35 U.S.C. 154(b) by 338 days.

(21) Appl. No.: 14/960,979

(22) Filed: Dec. 7, 2015

(65) Prior Publication Data

US 2016/0172923 A1   Jun. 16, 2016

(51) Int. Cl.
| | |
|---|---|
| H02K 11/00 | (2016.01) |
| H02K 5/128 | (2006.01) |
| H02K 5/173 | (2006.01) |
| F15B 15/14 | (2006.01) |
| H02K 5/16 | (2006.01) |

(52) U.S. Cl.
CPC ............ *H02K 5/128* (2013.01); *F15B 15/14* (2013.01); *H02K 5/161* (2013.01); *H02K 5/173* (2013.01); *H02K 2005/1287* (2013.01)

(58) Field of Classification Search
CPC ........ H02K 5/128; H02K 5/161; H02K 5/173; H02K 2005/1287; H02K 5/132
USPC .............................................. 310/86–88, 68 B
See application file for complete search history.

(56) References Cited

U.S. PATENT DOCUMENTS

| | | | |
|---|---|---|---|
| 2,603,161 A | 7/1952 | Lloyd | |
| 2,673,301 A | 3/1954 | Richter | |
| 3,733,504 A * | 5/1973 | Dennis | H02K 5/128 |
| | | | 310/105 |
| 3,911,300 A | 10/1975 | Lebkuchner | |
| 4,023,261 A | 5/1977 | Piette | |
| 4,529,362 A | 7/1985 | Ichiryu | |
| 6,140,725 A | 10/2000 | Jensen | |
| 9,077,217 B2 * | 7/2015 | Morris | H02K 5/128 |
| 2003/0161743 A1 | 8/2003 | Kimberlin | |
| 2009/0026878 A1 | 1/2009 | Hansen | |
| 2013/0077183 A1 | 3/2013 | An | |

(Continued)

FOREIGN PATENT DOCUMENTS

| | | |
|---|---|---|
| EP | 1271747 A1 | 1/2003 |
| EP | 2400639 A2 | 12/2011 |
| EP | 2634895 A2 | 9/2013 |

(Continued)

OTHER PUBLICATIONS

European Search Report for application No. EP14197799.1; dated May 29, 2015, 7 pages.

*Primary Examiner* — Thanh Lam
(74) *Attorney, Agent, or Firm* — Cantor Colburn LLP

(57) ABSTRACT

A motor for an electrohydraulic actuator (EHA). The motor comprises a rotary shaft for rotation about an axis (R), a rotor attached to the rotary shaft and rotatable therewith, a stator surrounding at least a portion of the rotor and a liner disposed between the rotor and the stator. The liner defines an axially extending chamber around the rotor for retaining a fluid between the rotor and the liner. The liner comprises a tubular body having an open end and a closed end. An EHA comprising the motor is also claimed.

14 Claims, 5 Drawing Sheets

(56) References Cited

U.S. PATENT DOCUMENTS

2013/0177405 A1    7/2013  Legros
2013/0221769 A1*   8/2013  Hansen ............... B29C 45/0005
                                                         310/43

FOREIGN PATENT DOCUMENTS

FR          2489897 A1    3/1982
WO        2013079178 A2   6/2013

* cited by examiner

A-A

MOTOR FOR AN ELECTROHYDRAULIC ACTUATOR

FOREIGN PRIORITY

This application claims priority to European Patent Application No. 14197799.1 filed Dec. 12, 2014, the entire contents of which are incorporated herein by reference.

TECHNICAL FIELD

The present disclosure relates to a motor for Electrohydraulic Actuators (EHA) or Electrical Backup Hydraulic Actuators (EBHA). From here forward, the term Electrohydraulic Actuator (EHA) shall be used to describe both applications as they are interchangeable for the purpose of this discussion.

BACKGROUND

Electrohydraulic actuators are well-known in the art, and comprise a motor, a hydraulic pump and a hydraulic piston/ram. In operation, the motor is powered to drive the pump, which is used to pump hydraulic fluid to actuate the piston. An EHA may be used on an aircraft, with the piston operatively connected to a flight control surface.

A typical motor for an EHA typically comprises a magnetic rotor mounted to a rotary shaft, and a stator surrounding the rotor. The stator consists of a magnetically permeable core and field windings at locations on the core. The field windings may also be potted (i.e. coated and encased in a solid polymer compound, e.g. thermosetting plastics or silicone rubber) for resistance to shock, vibration, internal pressure and for exclusion of moisture and any corrosive substances. This is in contrast to the more widely used process of impregnating field windings with thin varnish. Supplying electrical current to the field windings generates a magnetic field in the stator core, which interacts with the magnetic rotor, and causes the rotary shaft to rotate. The rotary shaft can then be used to drive the pump, as is known in the art.

EHAs may be self-contained, in that the motor and pump are also used for holding the hydraulic fluid, such that the need for separate reservoirs and fluid connectors is removed. This may simplify actuator construction and make the EHA more reliable than conventional hydraulic actuators. An example of such an EHA is disclosed in U.S. Pat. No. 4,529,362.

A problem exists for motors used in EHAs of the art, in that segregating the motor from the hydraulic fluid in the pump is very difficult. All hydraulic fluids will attack and degrade certain coatings, plastics and elastomers. One such fluid, Skydrol®, a phosphate ester based fluid, is particularly well known for degrading a wide range of paints, polymers and elastomers. Contamination of the field windings, wiring and insulation system with such fluids may cause the electrical failure of the motor. The present disclosure seeks to provide an improved motor topology to address this problem.

SUMMARY

There is disclosed herein a motor for an electrohydraulic actuator (EHA). The motor comprises a rotary shaft for rotation about an axis, a rotor attached to the rotary shaft and rotatable therewith, a stator surrounding at least a portion of the rotor and a liner disposed between the rotor and the stator. The liner defines an axially extending chamber around the rotor for retaining a fluid between the rotor and the liner. The liner comprises a tubular body having an open end and a closed end.

The motor further comprises first and second bearings provided between the rotary shaft and the liner to support the shaft relative to the liner and to allow rotation of the shaft relative to the liner. The rotor is located axially between the first and second bearings. The tubular body of the liner comprises a wall having first and second thicknesses at first and second portions that are radially aligned with the first and second bearings respectively and a third thickness at a third portion that is radially aligned with both the rotor and the stator. The first and second thicknesses are both greater than the third thickness.

The term 'attached' should be understood to mean that the rotor is attached to the rotary shaft in such a way that they rotate together. For example, the rotor may be separately formed from the rotary shaft and (directly or indirectly) secured thereto, or alternatively, the rotor may be integrally formed with the rotary shaft.

The axis about which the rotary shaft rotates is the central longitudinal axis of the motor.

The term 'tubular' should be understood to mean elongated (along the axis) and hollow. The cross-section of the liner may or may not be circular. The liner may have a constant internal or external diameter along its length (in the axial direction) or the diameter may vary.

The first, second and third portions are axially extending, i.e. they extend generally in the axial direction and at least partially surround the rotor and/or shaft.

The rotary shaft may extend through the open end. The liner can be considered to be a sheath that encapsulates a portion of the length of the shaft and one end of the shaft.

The motor may be configured such that fluid can flow from the chamber to a connected hydraulic pump via the open end of the liner.

The rotor may be any suitable rotor as known in the art. For example, the rotor may comprise one or more permanent magnets. The rotor may comprise a plurality of separate rotor segments (e.g. magnets), each secured to the rotary shaft at different circumferential locations.

The rotor may have a substantially annular cross-section (in the radial direction). It may be operatively connected, e.g. secured, to the outer circumferential surface of the rotary shaft, i.e. the shaft may sit inside the rotor.

The stator may be any suitable stator as known in the art. For example, the stator may comprise a stator corepack and a plurality of field windings. The stator corepack may be composed of a high permeability material and may be a laminated structure.

The stator may have a substantially annular cross-section (in the radial direction). The stator may surround the rotor completely.

The stator and rotor may be substantially cylindrical in shape, i.e. annular in cross-section (in the radial direction) and elongated axially.

The liner is formed of any suitable fluid impermeable material, e.g. a material that is impermeable and resistant to hydraulic fluids, such as Skydrol®.

For example, the liner may be composed of a metallic material. Suitable metallic materials may include titanium or an alloy thereof, or a nickel-based alloy, for example with an electrical resistivity of $1 \times 10^{-6}$ ohms per meter, or greater. The liner may alternatively be composed of a composite material, for instance, carbon fibre or glass/ceramic fibre composites, as will be discussed further below.

The sleeve isolates the stator components from hydraulic fluid in the chamber. Isolating the stator from hydraulic fluid may improve the lifespan and reliability of the fielding windings and/or stator corepack. The liner also acts as a support structure within the motor, to reduce motor design complexity (i.e. fewer bearings liners, seals and structural support parts may be required).

The stator field windings may be potted or may be not potted. The isolation of the stator from hydraulic fluid may allow reduced thickness of potting or the removal of potting altogether.

The first and second portions may be unaligned with the rotor and stator.

The rotor has first and second axial ends. The liner may extend axially beyond the first and second rotor ends, i.e. the length of the liner may be greater than that of the rotor.

The stator has first and second axial ends. The liner may extend axially beyond the first and second stator ends, i.e. the length of the liner may be greater than that of the stator.

The first and second bearings may each be configured to allow hydraulic fluid to pass through itself, e.g. so that the whole of the rotor and the enclosed end of the shaft is in fluid communication with a connected hydraulic pump.

The first and second bearings may be secured to the shaft, for example, via an interference fit, which can be achieved, for example, by heat shrinking the bearings onto the shaft.

The first and second bearings may not be secured to the liner. For example, the bearings may contact the inner surface of the liner but not be fixed thereto.

The first bearing may be positioned between the open end of the liner and the rotor.

The second bearing may be positioned between the closed end of the liner and the rotor.

The motor may further comprise biasing means for urging the first bearing along the liner away from the open end and towards the closed end of the liner. Put another way, the biasing means may act to urge the open end of the liner away from the first bearing.

The biasing means may comprise a wave spring.

The biasing means may engage a first locating feature on the liner.

The shaft may comprise second and third locating features for receiving the first and second bearings respectively.

A seal may be provided to prevent fluid communication between the chamber and the stator. The seal thus prevents fluid communication between the rotor and the stator. The seal may be located such that fluid passing through the open end of the liner cannot travel to the stator.

The motor may further comprise a casing surrounding the stator. The casing may provide an external cover to protect the internal components, such as the stator and the rotor.

One or more seals (such as that discussed above) may be provided between the liner and the casing.

The stator may be secured to the casing.

The stator may be in thermal communication with the casing.

The casing may include a heat dissipation feature on an external surface thereof, such as a plurality of fins.

The motor may be a brushless motor and/or a stepper motor.

It may be important for the liner to be as thin as possible to allow maximum electromagnetic efficiency for the interaction between the stator and the rotor. However, the liner must still have sufficient thickness to provide the required strength to contain the pressure and loading that may occur due to the hydraulic fluid being present and the rotation of the rotor.

The third thickness may be 80% or less than the smaller of the first and second thicknesses.

The third thickness may be 1.2 mm or less, 1.0 mm or less or 0.8 mm or less.

For example, the third thickness may be about 0.7 to 0.9 mm and/or the first and second thicknesses may be at least 2 mm.

For example, the total length of the liner may be between 160 and 180 mm and/or the third portion may be between 60 and 80 mm long.

The liner and seal(s) (and e.g. a connected hydraulic pump) may be configured to withstand a hydraulic fluid pressure of 20 MPa (200 bar) or even 24 MPa (240 bar), in case the chamber becomes exposed to the hydraulic fluid of the main hydraulic circuit of an aircraft, due to failure thereof (in the case of a EBHA).

The motor may further comprise a position sensor for determining the angular displacement of the shaft about the rotational axis. The position sensor may have a portion located about an outer diameter of the liner and be located axially between the closed end of the liner and the second bearing. The liner may have a reduced diameter portion and/or a reduced wall thickness portion, relative to that at the second portion of the liner, to accommodate the portion of the position sensor.

The position sensor may comprise a second portion attached to the end of the rotary shaft located within the closed end of the liner. The first portion of the sensor may detect the angular position of the second portion, as is known in prior art rotational position sensors. The reduced wall thickness may allow the first and second portions of the sensor to communicate more easily/efficiently with each other.

The liner may be a unitary integrally formed piece, i.e. a one-piece tubular body. Alternatively, the liner may comprise a plurality of separately formed and connected sections. The different sections may be made of the same or different materials.

The portion forming the closed end of the liner may be integrally formed with the second portion of the liner.

At least the third portion of the liner that is radially aligned with at least a portion of the rotor and the stator may comprise a resin impregnated fibre composite. The whole of the liner may be formed from such a composite, or only the third portion.

Forming the third portion of the liner from a resin impregnated fibre composite may reduce the amount of eddy currents induced in that portion of the liner. Eddy currents in the liner may cause undesirable heating, which can degrade the lifetime of the liner and the motor, and/or may reduce the efficiency of the motor.

Without wishing to be bound by theory, it is believed that eddy currents are more highly induced in highly conductive materials, such as metals. Fibre resin impregnated composites, which are well known in the art, tend to provide higher electrical resistance than metallic materials, either due to their native electrical properties or due to the geometry of their production (e.g. using long continuous filaments). Thus, by employing a fibre resin impregnated composite in at least a portion of the liner exposed to the magnetic pulses of the stator the induction of eddy currents in the liner and any related heating effects may be reduced or prevented.

The third portion may extend for at least the entire length of the rotor, i.e. so that it overlaps the whole rotor. Alternatively, the third portion may be shorter than the rotor.

The resin impregnated fibre composite may comprise any suitable fibres, such as but not limited to carbon fibres, glass fibres and/or ceramic fibres.

The composite may be formed from fibres that have a length of at least 10 mm, or at least 25 mm, or at least 50 mm or at least 100 mm. Such fibres are known as 'continuous' in the art. The fibres may be as long, or even longer, than the part that is being produced. Such fibres provide a much stronger composite than injection moulded plastic composites having much smaller chopped fibres (e.g. less than 10 mm).

The composites may be formed, for example, by using lay-up or filament wound techniques. The composite may therefore be a woven cloth composite or a filament wound composite.

The composite may comprise at least 40% fibre content, or at least 50% fibre content, or at least 60% fibre content, by volume.

The composite may be formed through impregnation of a fibre network with any suitable resin, as is known in the art, for example, an epoxy resin or PEEK. The fibres may be impregnated with resin prior to heat/pressure treatment to cure the resin and form the resin impregnated fibre composite (this known commonly in the art as a prepreg).

The first and second portions may be formed separately from the third portion and from a different material to the third portion.

For example, the second and third portions may comprise a metallic material, such as an alloy described above.

The present disclosure also extends to a method of manufacturing a motor (for an EHA) as described above. The method comprises the steps of forming at least the third portion of the liner from a resin impregnated fibre composite using a lay-up or filament wound technique and positioning the liner around the rotor and within the stator so that it extends axially between the stator and rotor.

The fibres may have any of the features discussed above.

The present disclosure also extends to an electrohydraulic actuator (EHA) comprising a piston, a hydraulic pump in fluid communication with the piston and the motor, as described above. The rotary shaft of the motor is driveably connected to the hydraulic pump and the chamber is in fluid communication with the pump.

As mentioned above, the term EHA should be considered to also cover EBHA.

The open end of the liner may be connected to the hydraulic pump. As mentioned above, fluid may pass from the chamber to the hydraulic pump via the open end of the liner. The fluid may then pass through the pump and act on the piston. As such, the chamber is also in fluid communication with the piston. The piston may actuate a flight control surface, or another part of an aircraft.

From another aspect, the present invention provides a method of operating an electrohydraulic actuator (EHA) using the motor described above.

BRIEF DESCRIPTION OF DRAWINGS

Exemplary embodiments of the present disclosure will now be described by way of example only and with reference to FIGS. 1 to 6, of which.

DETAILED DESCRIPTION

Figure 1:
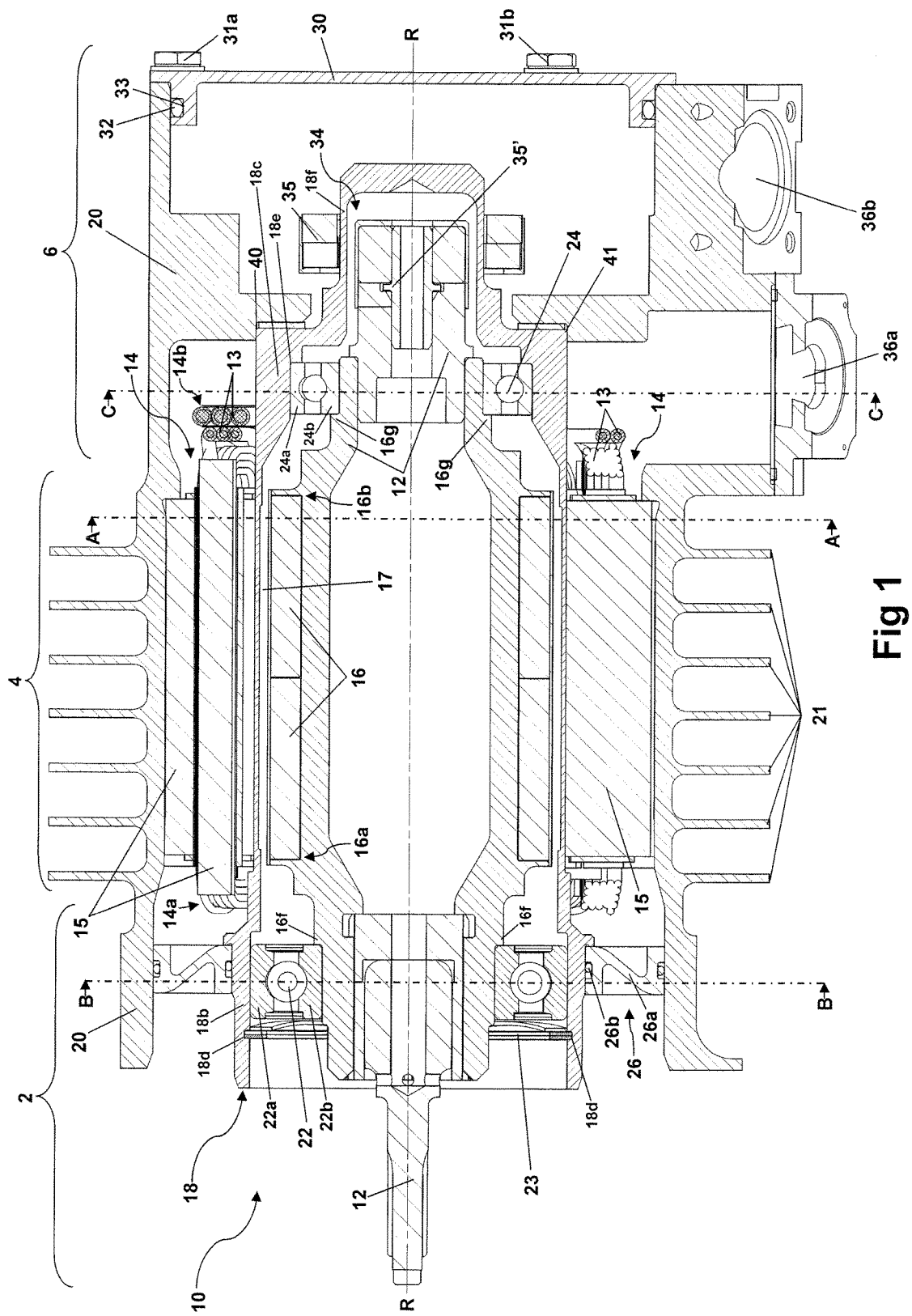
FIG. 1 is an axial cross-sectional view of a motor in accordance with an embodiment of the present disclosure.

FIG. 1 shows a motor 10, according to an embodiment of the present disclosure, of an EHA or EBHA. The motor 10 has three main sections: a drive end 2, a middle portion 4 and a non-drive end 6. The motor 10 comprises a rotary shaft 12 rotatable around an axis R and having a rotor 16 mounted thereto and a stator 14 encircling the shaft 12 and rotor 16. The rotor 16 and stator 14 each have first and second axial ends 16a, 14a and 16b, 14b, respectively. The stator 14 comprises fielding windings 13 and a stator corepack 15.

A liner 18 is positioned between the rotor 16 and the stator 14. The liner 18 defines a chamber 17 between the liner 18 and the rotor 16. The chamber 17 is annular in shape and extends around the rotor 16. Bearings 22 and 24 are positioned at the drive end 2 and the non-drive end 6, respectively, and are used to secure the rotary shaft 12 in position within the liner 18, whilst allowing the shaft 12 to rotate about axis R. A bearing pre-load wave spring and retaining ring 23 is secured to the liner 18 adjacent the drive end 2, via a notch 18d on the liner 18. The spring 23 applies a load to the bearings 22, 24. Bearing 22 is generally a larger or more robust bearing than bearing 24, as the drive end 2 of the motor 10 has greater loading to be supported.

A position sensor system 34, comprising a static portion 35 and a rotor portion 35' from which it takes its reading is located at the non-drive end 6 of the motor 10. The rotor portion 35' is located within the rotary shaft 12 and rotates therewith, relative to the static portion 35, which is fixed relative to the liner 18. As the rotor portion 35' rotates with rotary shaft 12, the position sensor 34 generates a signal indicative of the rotary position/number of rotations/speed of the rotary shaft 12, as is well-known in the art. This allows positional feedback of the shaft 12 for controlling the motor. As the skilled person will recognise, position sensor 34 may be a Hall-effect position sensor, however, any other suitable position sensor could be used and placed in any suitable position within the motor 10, without departing from the scope of this disclosure.

The liner 18 has a reduced diameter and wall thickness portion 18f for accommodating static portion 35 of the sensor 34.

The motor 10 further comprises a casing 20 that surrounds the stator 14 and liner 18. The casing 20 suitably covers and protects the internal components of the motor 10 from the environment. The stator 14 is connected to and in thermal communication with the casing 20, allowing the dissipation of heat from the stator 14 to the environment external of the casing 20. To this end, the casing 20 may include fins 21 formed thereon, which can increase the rate of heat dissipation from the casing 20.

A seal and support piece 26, comprised of a z-shaped member 26a and a pair of O-rings 26b, is provided at the drive end 2 between the liner 18 and the casing 20. Seal and support piece 26 forms a fluid seal between the liner 18 and casing 20 to prevent fluid ingress to the stator 14. The seal and support piece 26 also supports and centralises the liner 18 within the casing 20.

At the non-drive end 6 of the motor 10 the casing 20 contacts the liner 18 at contact points 40, 41. Contact points 40, 41 and seal 26 allow load transfer from the liner 18 to the casing 20.

The casing 20 also includes ports 36a, 36b formed therein for securing electrical control connectors (not shown), which may be wired to various motor components and used to control the motor 10, as is known in the art. The casing 20 includes an outer cover 30 secured thereto with bolts 31a, 31b. The outer cover 30 also includes a recessed portion 33 and an O-ring 32 disposed therein, which provides an environmental seal between the outer cover 30 and the casing 20. The outer cover 30 may be removed by removal of bolts 31a, 31b to allow access to the interior of the motor 10 for maintenance purposes.

Figure 2:
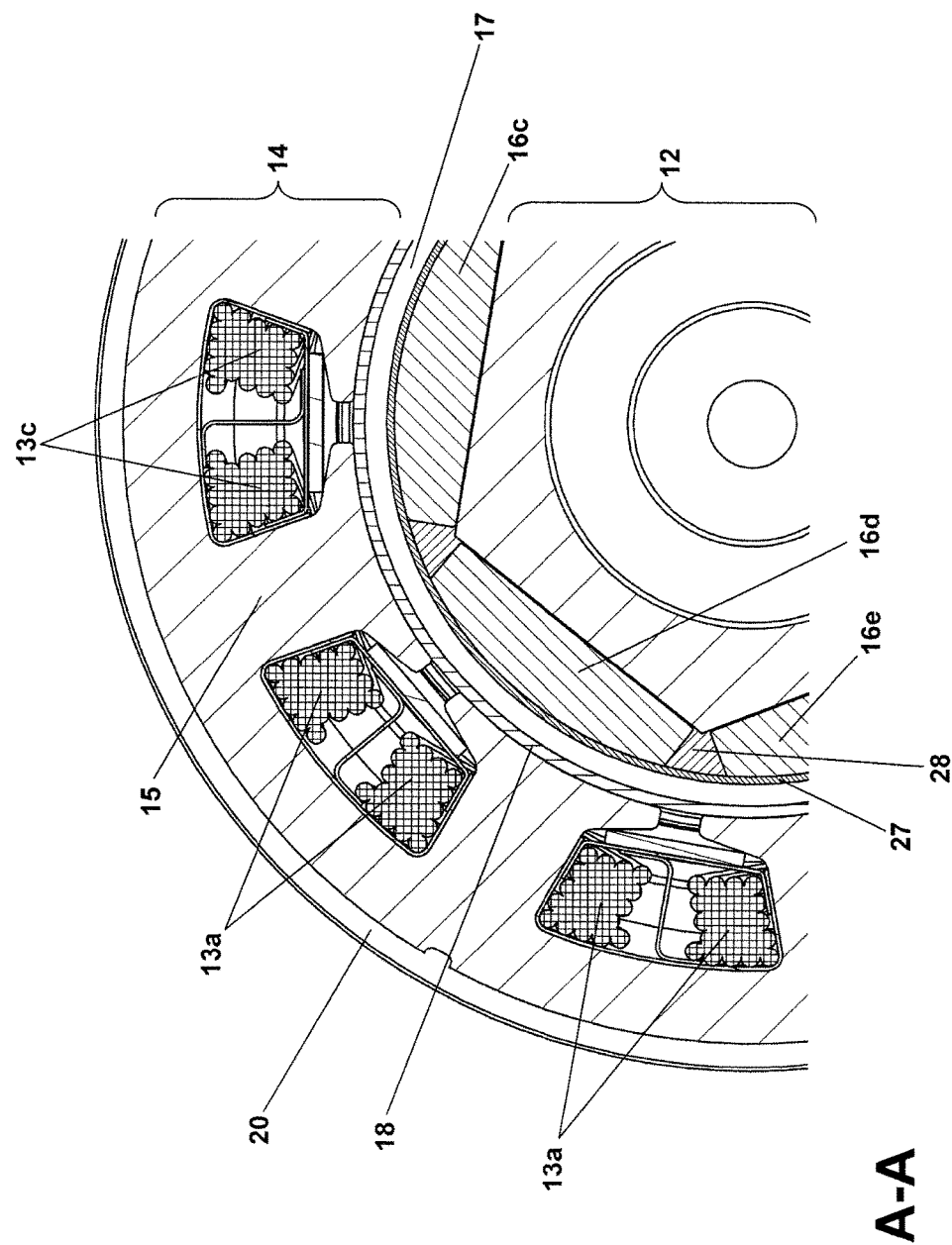
FIG. 2 is a radial cross-sectional view of the motor of FIG. 1.

FIG. 2 shows a radial cross-sectional view through the motor 10. In particular, FIG. 2 shows a cross-section viewed down the rotational axis R of the motor 10, along line A-A shown in FIG. 1.

FIG. 2 shows the rotary shaft 12 and a plurality of magnets 16c, 16d, 16e mounted thereto. In this particular embodiment, the magnets 16c, 16d, 16e have rotor spacers 28 separating them from each other and a rotor can 27 around their outside. The stator 14 encircles the magnets 16c, 16d, 16e and includes the stator corepack 15 and a plurality of field windings 13a, 13b, 13c. The casing 20 surrounds the outside of the stator 14. The liner 18 is disposed radially inward of the stator 14, surrounding the magnets 16c, 16d, 16e and the rotary shaft 12, and is separated from the magnets 16c, 16d, 16e by the chamber 17, which is formed around the magnets 16c, 16d, 16e. As will be readily recognised by one skilled in the art, the motor 10 may be a brushless electric motor and in particular may be a stepper motor.

Figure 3:
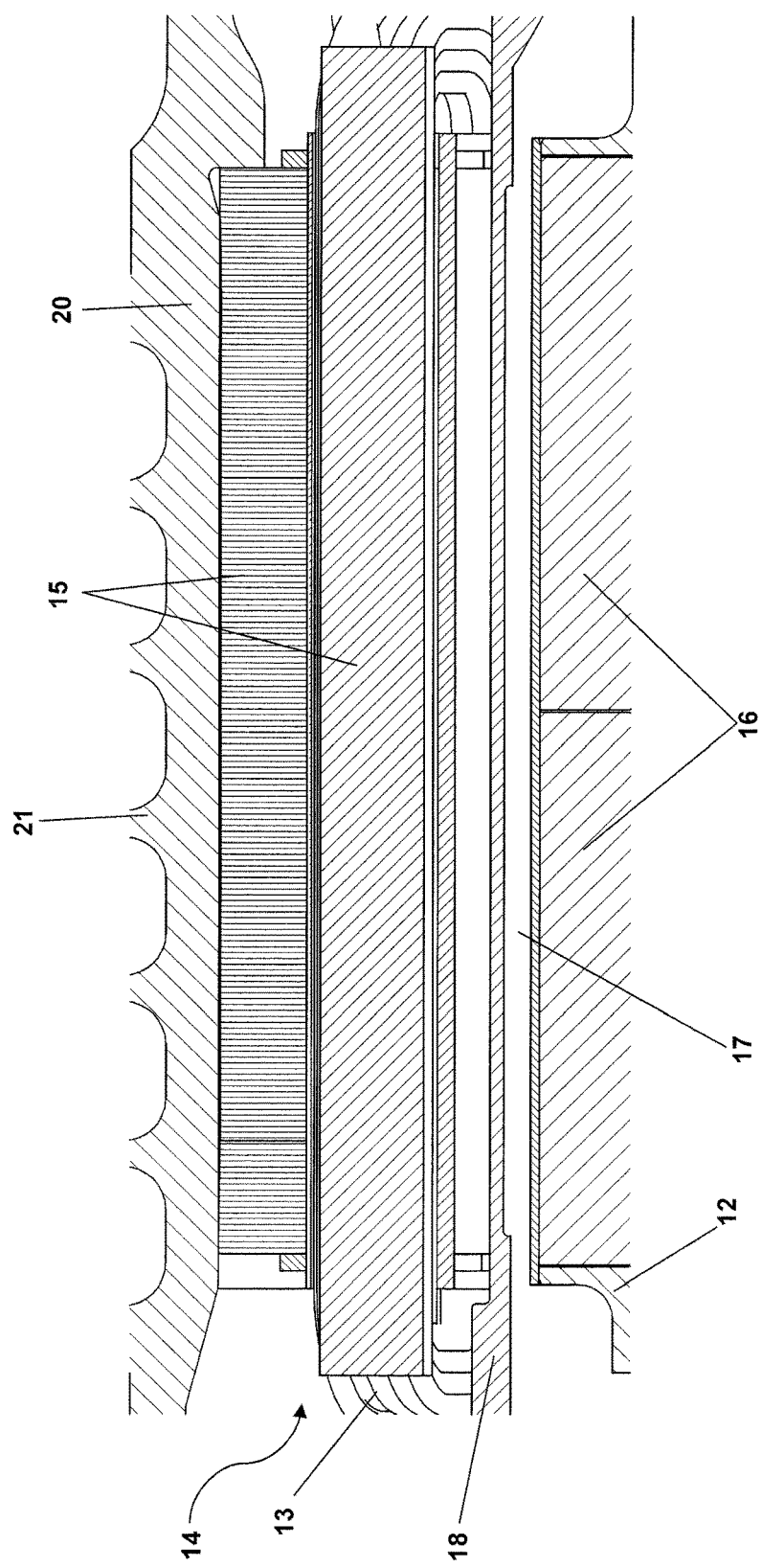
FIG. 3 is an enlarged view of a portion of the motor of FIG. 1.

FIG. 3 shows a more detailed view of the middle portion 4 of the motor 10. This figure shows more clearly the chamber 17 formed between the liner 18 and the rotor 16. Shown in this figure is a particular embodiment of the present disclosure in which the liner 18 is a unitary integrally formed piece.

In use, motor 10 can be operated to power a pump for hydraulic fluid. Hydraulic fluid will pass through bearings 22, 24 and be retained within liner 18 around the rotor 16 and rotary shaft 12, i.e. in the chamber 17. The liner 18 and the fluid seal 26 between the liner 18 and casing 20 therefore isolates the stator 14 from the hydraulic fluid within the motor 10. The fluid-retaining and load-transferring properties of the liner 18 mean that the motor 10 may have fewer components (e.g. seals, bearings, structural support pieces etc.). This reduces the complexity and cost of the motor 10 to manufacture and maintain.

Figure 4:
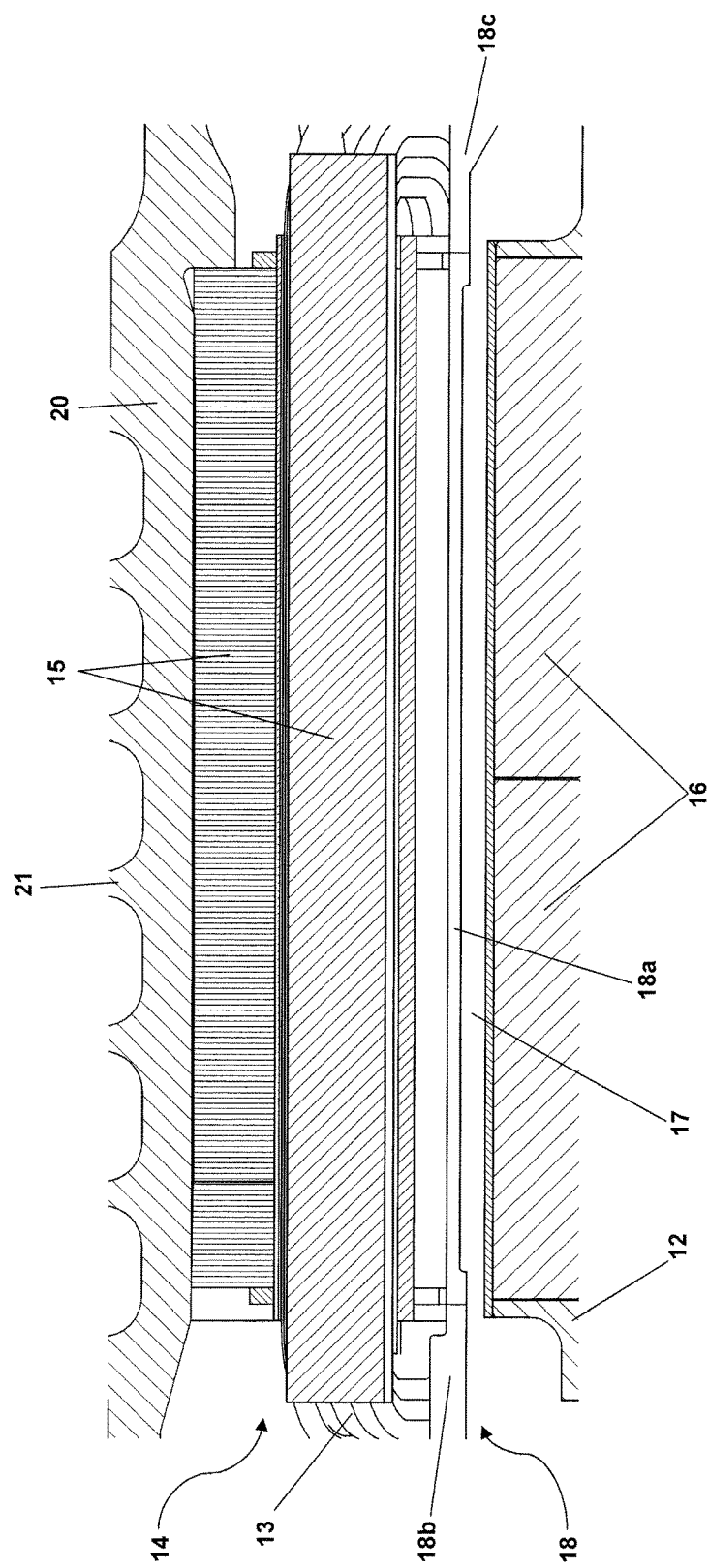
FIG. 4 is an enlarged view of a portion of a motor in accordance with an alternative embodiment of the present disclosure.

FIG. 4 shows a more detailed view of the liner 18 feature, in accordance with an alternative embodiment of the present disclosure. The liner 18 comprises a central ('first') portion 18a and end ('second' and 'third') portions 18b, 18c.

In this embodiment, the central portion 18a is a fibre resin impregnated composite (e.g. a carbon fibre composite) and the end portions 18b, 18c are metallic (e.g. a Ti alloy). The central portion 18a of the liner 18 extends for the majority of the axial extent of the stator 14 such that the majority of the magnetic field which interacts with the rotor magnets 16, 16c, 16d, 16e does so by passing through the fibre resin composite. The lower conductivity (relative to a metallic material) of this fibre resin composite section reduces the loss of energy in the liner portion 18a from the formation of eddy currents therein.

End portions 18b, 18c are separate pieces from the central portion 18a and are connected to the central portion by any suitable method as would be known in the art (e.g. bonding). The liner 18 may be constructed in this manner to reduce the amount of composite used in the assembly, reducing manufacture costs/complexity. In alternative embodiments, the whole liner 18 may instead be a unitary integrally formed piece (as shown in FIG. 3) made of fibre resin impregnated composite. This may have the added advantage of being lighter weight than the embodiment of FIG. 4. Alternatively, the liner 18 of FIG. 3 may be formed of a metallic material, such as a Ti alloy, desirably having an electrical resistivity of $1\times10^{-6}$ ohms per meter or greater, to reduce energy losses, as described above.

Additionally, the embodiments of FIGS. 3 and 4 show the liner 18 having a reduced thickness central portion 18a that extends between the axial ends 14a, 14b of the stator 14. This reduced thickness portion 18a not only reduces weight in this region, but allows the rotor 16 and stator 14 to be positioned closer together. This provides a more compact actuator design and provides better electromagnetic efficiency. The reduced thickness portion 18a may also extend between the axial ends 16a, 16b of the rotor. Alternatively, the entire length of the liner 18 may have the same thickness.

Figure 6:
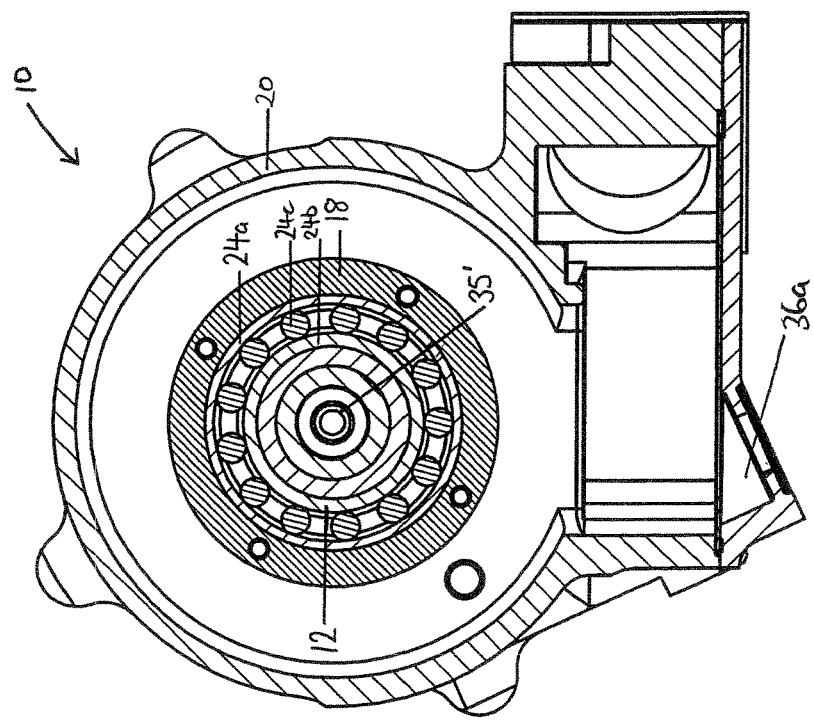
FIG. 6 is a radial cross-sectional view of the motor of FIG. 1.
Figure 5:
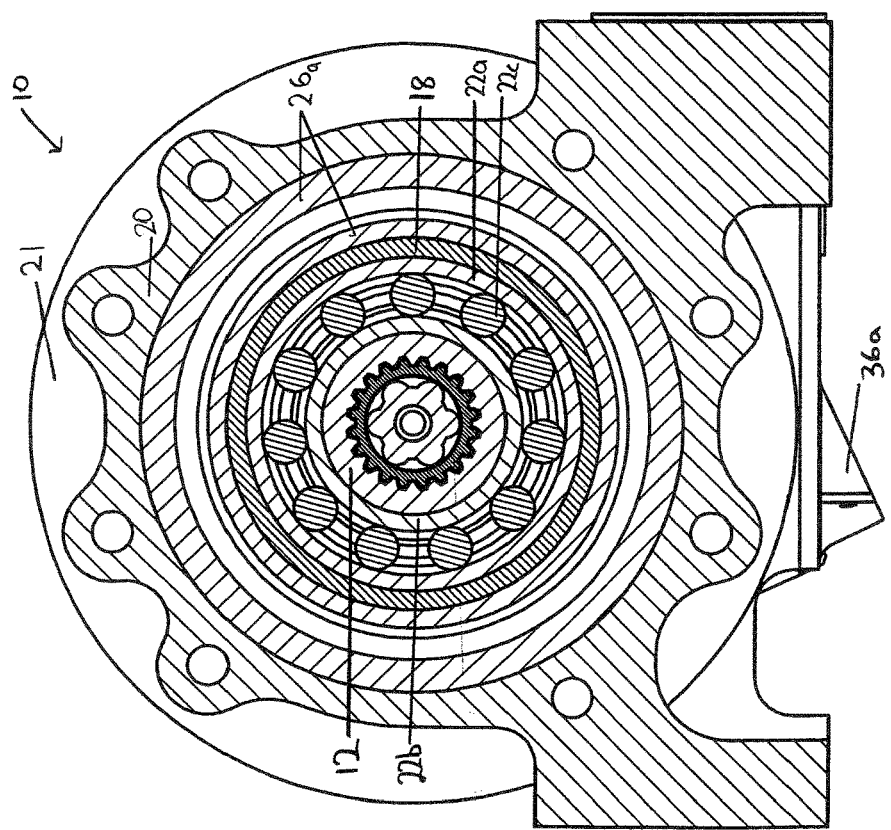
FIG. 5 is a radial cross-sectional view of the motor of FIG. 1.

FIGS. 5 and 6 show radial cross-sectional views of the motor taken along lines B-B and C-C in FIG. 1.

FIG. 5 shows first bearing 22 having an outer race 22a, inner race 22b and a plurality of ball bearings 22c positioned therebetween. As can be seen in FIG. 1, inner race 22b engages protrusion 16f on the outer surface of shaft 16. Wave spring 23 is arranged to press bearing 22 against protrusion 16f. Inner race 22b may be secured to the outer surface of shaft 16, for example by being heat shrunk thereon. Outer race 22a is in sliding contact with the inner surface of liner 18.

FIG. 6 shows second bearing 24 having an outer race 24a, inner race 24b and a plurality of ball bearings 24c positioned therebetween. As can be seen in FIG. 1, inner race 24b is held between protrusion 16g on the shaft 16 and protrusion 18e on the liner 18. Inner race 24b may be secured to the outer surface of shaft 16, for example by being heat shrunk thereon. Outer race 24a is in sliding contact with the inner surface of liner 18.

The liner 18 has first and second walls 18b, 18c, which are radially aligned with the first and second bearings 22, 24 and have an increased thickness compared to thinner portion 18a. This provides extra strength and rigidity compared to the thinner portion 18a.

The thinner portion 18a may have a thickness, e.g. of about 0.7 to 0.9 mm, whilst the thicker portions 18b, 18c may have thickness of over 2 mm. The total length of the liner 18 may be about 170 mm, with the reduced thickness portion 18a being about 70 mm long.

Although the figures and the accompanying description describe particular embodiments, it is to be understood that the scope of this disclosure is not to be limited to such specific embodiments, and is, instead, to be determined by the scope of the following claims.

The invention claimed is:

1. A motor for an electrohydraulic actuator (EHA), the motor comprising:
a rotary shaft for rotation about an axis (R);
a rotor attached to the rotary shaft and rotatable therewith;
a stator surrounding at least a portion of the rotor;

a liner disposed between the rotor and the stator, wherein the liner defines an axially extending chamber around the rotor and comprises a tubular body having an open end and a closed end;

first and second bearings provided between the rotary shaft and the liner to support the shaft relative to the liner and to allow rotation of the shaft relative to the liner, the rotor being located axially between the first and second bearings, wherein the tubular body of the liner comprises a wall having first and second thicknesses at first and second portions that are radially aligned with the first and second bearings respectively and a third thickness at a third portion that is radially aligned with both the rotor and the stator, the first and second thicknesses being greater than the third thickness; and a position sensor for determining the angular displacement of the shaft about the axis (R), wherein the position sensor has a portion located about an outer diameter of the liner axially between the closed end of the liner and the second bearing and the liner has a reduced diameter portion and/or a reduced wall thickness portion, relative to that at the second portion, to accommodate the portion of the position sensor.

2. The motor of claim 1, wherein the first and second bearings are secured to the shaft.

3. The motor of claim 1, wherein the first and second bearings are not secured to the liner.

4. The motor of claim 1, wherein the first bearing is positioned between the open end of the liner and the rotor and the second bearing is positioned between the closed end of the liner and the rotor, and the motor further comprises biasing means for urging the first bearing along the liner towards the closed end of the liner.

5. The motor of claim 4, wherein the biasing means comprises a wave spring.

6. The motor of claim 4, where the biasing means engages a first locating feature on the liner.

7. The motor of claim 1, wherein the shaft comprises second and third locating features for receiving the first and second bearings respectively.

8. The motor of claim 1, wherein the third thickness is:
80% or less than the smaller of the first and second thicknesses;
1.2 mm or less;
1.0 mm or less; and/or
0.8 mm or less.

9. The motor of claim 1, wherein at least the third portion of the liner comprises a resin impregnated fibre composite.

10. The motor of claim 9, wherein the resin impregnated fibre composite comprises carbon fibre, glass fibre and/or ceramic fibre.

11. The motor of claim 9, wherein the third portion is formed separately from the first and second portions and from a different material.

12. The motor of claim 11, wherein the first and second portions comprise a metallic material.

13. The motor of claim 1, wherein the liner consists of a unitary integrally formed piece.

14. An electrohydraulic actuator (EHA), comprising:
a piston;
a hydraulic pump in fluid communication with the piston; and
the motor of claim 1, wherein the rotary shaft of the motor is driveably connected to the hydraulic pump and the chamber is in fluid communication with the pump.

* * * * *